United States Patent Office 3,262,931
Patented July 26, 1966

3,262,931
DERIVATIVES OF 3,3-SPIRO-SUBSTITUTED-3,4-DIHYDRO - 1,2,4 - BENZOTHIADIAZINE-1,1-DIOXIDES
Edward J. Cragoe, Jr., Lansdale, Pa., assignor to Merck & Co., Inc., Rahway, N.J., a corporation of New Jersey
No Drawing. Filed May 8, 1961, Ser. No. 108,273
4 Claims. (Cl. 260—243)

This invention is concerned with novel 3,3-spiro-substituted - 3,4-dihydro-1,2,4-benzothiadiazine-1,1-dioxides wherein the spiro-substitutent is a 6-membered alicyclic ring having an aliphatic-oxy substitutent attached to the 4' carbon of the spiro structure. The aliphatic-oxy-substituent advantageously is a lower aliphatic-oxy-substituent having preferably up to 6 carbon atoms in the aliphatic portion of the group and is either a straight chain, branched chain or alicyclic aliphatic-oxy radical. The 4'-aliphatic-oxy-substituent advantageously is selected either from the straight or branched chain hydrocarbon aliphatic-oxy groups such as methoxy, ethoxy, propoxy, isopropoxy, butoxy, isobutoxy, sec.-butoxy, pentyloxy, isopentyloxy, tert-butoxy, hexyloxy, or any of the various branched chain, 6-carbon aliphatic-oxy hydrocarbons; or among the alicyclic aliphatic-oxy radicals, preferably an alicyclic hydrocarbon such as cyclopropoxy, cyclobutoxy, cyclopentyloxy, and cyclohexyloxy, the alicyclic structures being either unsubstituted or alkyl-substituted, but preferably having no more than a total of 6 carbon atoms in the 4'-substituent grouping.

The novel compounds of this invention also contain a sulfamyl-substitutent attached to the benzenoid moiety of the benzothiadiazine structure as well as at least one additional substituent selected from halogen or halogen-like radicals, as chlorine, bromine, fluorine, iodine, trifluoromethyl, trichloromethyl, dichloromethyl and the like; lower alkyl as methyl, ethyl, propyl and the like or similar alkyl groups having a substituent, such as a halogen, attached to one or more of the carbons in the alkyl group; lower alkoxy, such as methoxy, ethoxy, propoxy, and the like; nitro or amino. The preferred compounds are those wherein the sulfamyl substituent is attached to the 7-position of the benzothiadiazine structure and the other substituents are attached preferably to either or both of the 5- and/or 6-positions of the benzothiadiazine nucleus.

The novel compounds of this invention possess very potent saluretic properties and are therefore useful in lowering the sodium and chloride ion concentration of the blood. Because of this property the compounds can be used for the treatment of conditions resulting from an excessive concentration of sodium chloride such as in the treatment of edema, hypertension, and the like. The compounds of this invention can be administered in dosage forms known to be suitable for the administration of the other benzothiadiazine type diuretic agents and can be administered either alone in the form of pills, capsules, tablets and the like, or admixed with antihypertensive or other therapeutically effective compounds in a single dosage form.

The novel compounds of this invention can be prepared by several methods. One method which has been found very useful in preparing the novel compounds involves reacting the appropriate disulfamylaniline and 4-(aliphaticoxy)cyclohexanone with moderate heating. Where feasible, excess ketone can be employed for its solvent properties, although other solvents can be used instead. Some solvents which were found to be suitable include dimethylformamide, dioxane, diethylene glycol dimethyl ether, ethylene glycol dimethyl ether and the like.

If it is desired to carry the reactions to completion more quickly, it can be catalyzed with potassium fluoride in dimethylformamide or with an acid such as sulfuric acid, methanesulfonic acid, benzenesulfonic acid, p-toluenesulfonic acid, or other aliphatic or aromatic sulfonic acids in other media.

Another quite satisfactory method involves reacting the appropriate disulfamylaniline and ketal. The ketal can be cyclic in structure or acyclic or perhaps in the form of its enol ether which is readily generated from the ketal under acid conditions. The reaction preferably is carried out with moderate heating in the presence of a solvent and a few drops of acid which catalyzes the reaction. Butanol is a satisfactory solvent, though other alcohols as amyl alcohol, propanol and the like, or an alcohol admixed with other solvents as dioxane, diethylene glycol dimethyl ether, ethylene glycol dimethyl ether and the like can be used.

It will be apparent from the above discussion that the novel compounds of this invention can be prepared by reacting the appropriate disulfamylaniline with a 4-(aliphatic-oxy)-cyclohexanone and that said ketone can be replaced by a reactive, functional derivative of the same, such as a ketal or an enol ether, or a ketimine or by a substance which under the reaction condition in question is converted to the ketone, such as the hydrosulfite or cyanohydrin of the ketone and that the reaction can be effected with or without an added solvent and with or without a catalyst, but preferably with heating.

The preparation of representative compounds of this invention is described in more detail in the following examples wherein all melting points are corrected except where otherwise stated, and wherein the petroleum ether employed is Merck & Co. Inc's Benzin, B.P. 30–60° C.

EXAMPLE 1

4'-methoxy-6-chloro-7-sulfamylspiro-[1,2,4-benzothiadiazine-3(4H),1'-cyclohexane]-1,1-dioxide

STEP A.—PREPARATION OF 4-METHOXYCYCLOHEXANOL p-Methoxyphenol (62.1 g., 0.50 mole) is hydrogenated in 170 ml. of ethanol in the presence of 6.0 g. of Raney nickel at a pressure of 2000 p.s.i. and a temperature of 130–135° C. The catalyst then is removed by filtration and the ethanol removed from the filtrate by distillation at reduced pressure. The 4-methoxycyclohexanol is fractionally distilled to give 55.4 g. (82%), B.P. 206.5° C. at 742 mm. pressure in the form of a colorless oil.

STEP B.—PREPARATION OF 4-METHOXYCYCLOHEXANONE

A one liter, 3-necked, round-bottomed flask fitted with a stirrer, condenser and thermometer is charged with potassium dichromate (85 g., 0.29 mole), water (400 ml.) and concentrated sulfuric acid (115 g.). The solution is stirred and 4-methoxycyclohexanol (55.4 g., 0.43 mole) is added in several portions through the condenser. The temperature rises to 75° C. and stirring is continued until the reactants cool to a temperature of 30° C. The reaction mixture is extracted with three 150 ml. portions of ether, and the combined ether extracts are dried over sodium sulfate. The ether then is removed by distillation and the residue distilled to give 22 g. (42%) of 4-methoxycyclohexanone in the form of a colorless oil, B.P. 97° C. at 27 mm. pressure.

STEP C.—PREPARATION OF 4'METHOXY-6-CHLORO-7 - SULFAMYLSPIRO - [1,2,4-BENZOTHIADIAZINE - 3-(4H),1'-CYCLOHEXANE]-1,1-DIOXIDE

4 - amino - 6 - chloro - 1,3 - benzenedisulfonamide (0.02 mole) and 4-methoxycyclohexanone (0.04 mole) are dissolved in dimethylformamide (25 ml.) and heated on a steam bath for 48 hours. The reaction mixture is cooled, treated with methanol (100 ml.), and then water (300 ml.) gradually is added with stirring. The aqueous layer is decanted and the residual viscous product is triturated with petroleum ether (100 ml.). The resulting solid is removed by filtration and dried to give a 50% yield of 4'-methoxy-6-chloro-7-sulfamylspiro-[1,2,4-benzothiadiazine-3(4H),1'-cyclohexane]-1,1-dioxide which, after recrystallization from acetic acid and dimethylformamide, melts at 227–229° C.

*Analysis.*—Calculated for $C_{13}H_{18}ClN_3O_5S_2$: C, 39.44; H, 4.58; N, 10.61. Found: C, 39.15; H, 4.58; N, 10.58.

EXAMPLE 2

*4'-ethoxy-6-trifluoromethyl-7-sulfamylspiro-[1,2,4-benzothiadiazine-3(4H),1'-cyclohexane]-1,1-dioxide*

STEP A.—PREPARATION OF 4-ETHOXYCYCLOHEXANONE

By replacing the p-methoxyphenol employed in Example 1, Step A, by an equimolecular quantity of p-ethoxyphenol and following substantially the same procedures described in Example 1, Steps A and B, there is obtained 4-ethoxycyclohexanone.

STEP B.—PREPARATION OF 4'-ETHOXY-6-TRIFLUOROMETHYL - 7 - SULFAMYLSPIRO - [1,2,4 - BENZOTHIADIAZINE-3(4H),1'-CYCLOHEXANE]-1,1-DIOXIDE

By replacing the disulfamylaniline and the ketone reactants employed in Step C of Example 1 by equimolecular quantities of 4-amino-6-trifluoromethyl-1,3-benzenedisulfonamide and 4-ethoxycyclohexanone respectively, and following substantially the same procedure described in Step C of Example 1, there is obtained 4'-ethoxy - 6 - trifluoromethyl - 7 - sulfamylspiro - [1,2,4-benzothiadiazine-3(4H),1'-cyclohexane]-1,1-dioxide.

EXAMPLE 3

*4'-propoxy-6-nitro-7-sulfamylspiro-[1,2,4-benzothiadiazine-3(4H),1'-cyclohexane]-1,1-dioxide*

STEP A.—PREPARATION OF 4-PROPOXYCYCLOHEXANONE

By replacing the p-methoxyphenol employed in Example 1, Step A, by an equimolecular quantity of p-propoxyphenol and following substantially the same procedures described in Steps A and B of Example 1, there is obtained 4-propoxycyclohexanone.

STEP B.—PREPARATION OF 4'-PROPOXY-6-NITRO-7-SULFAMYLSPIRO - [1,2,4 - BENZOTHIADIAZINE - 3-(4H),1'-CYCLOHEXANE]-1,1-DIOXIDE

By replacing the disulfamylaniline and the ketone reactants employed in Example 1, Step C, by equimolecular quantities of 4-amino-6-nitro-1,3-benzenedisulfonamide and 4-propoxycyclohexanone respectively, and following substantially the same procedure described in Step C of Example 1, there is obtained 4'-propoxy-6-nitro-7-sulfamylspiro - [1,2,4 - benzothiadiazine - 3(4H),1' - cyclohexane]-1,1-dioxide.

EXAMPLE 4

*4'-propoxy-6-amino-7-sulfamylspiro-[1,2,4-benzothiadiazine-3(4H),1'-cyclohexane]-1,1-dioxide*

This compound can be prepared either by replacing the disulfamylaniline employed in Step C of Example 3 by an equimolecular quantity of 4,6-diamino-1,3-benzenedisulfonamide or it can be prepared by reducing the 6-nitro compound obtained as described in Example 3. Reduction can be effected by adding the 6-nitro compound to a 50% alcohol-water mixture and shaking in an atmosphere of hydrogen in the presence of 400 mg. of platinum until hydrogen absorption ceases. The catalyst can be removed by filtration and the solvents removed by drying in vacuo to give 4'-propoxy-6-amino-7-sulfamylspiro - [1,2,4 - benzothiadiazine - 3(4H),1' - cyclohexane]-1,1-dioxide.

EXAMPLE 5

*4'-butoxy-6-methyl-7-sulfamylspiro-[1,2,4-benzothiadiazine-3(4H),1'-cyclohexane]-1,1-dioxide*

STEP A.—PREPARATION OF 4-BUTOXYCYCLOHEXANONE

By replacing the p-methoxyphenol employed in Example 1, Step A, by an equimolecular quantity of p-butoxyphenol and following substantially the same procedures described in Steps A and B of Example 1, there is obtained 4-butoxycyclohexanone.

STEP B.—PREPARATION OF 4'-BUTOXY-6-METHYL-7-SULFAMYLSPIRO - [1,2,4 - BENZOTHIADIAZINE - 3-(4H),1'-CYCLOHEXANE]-1,1-DIOXIDE

By replacing the disulfamylaniline and the ketone reactants employed in Example 1, Step C, by equimolecular quantities of 4 - amino - 6 - methyl - 1,3 - benzenedisulfonamide and 4-butoxycyclohexanone respectively, and following substantially the same procedure described in Step C of Example 1, there is obtained 4'-butoxy-6-methyl - 7 - sulfamylspiro - [1,2,4 - benzothiadiazine-3(4H),1'-cyclohexane]-1,1-dioxide.

EXAMPLE 6

*4'-pentyloxy-6-bromo-7-sulfamylspiro-[1,2,4-benzothiadiazine-3(4H),1'-cyclohexane]-1,1-dioxide*

STEP A.—PREPARATION OF 4-PENTYLOXYCYCLOHEXANONE

By replacing the p-methoxyphenol employed in Example 1, Step A, by an equimolecular quantity of p-pentyloxyphenol and following substantially the same procedures described in Example 1, Steps A and B, there is obtained 4-pentyloxycyclohexanone.

STEP B.—PREPARATION OF 4'-PENTYLOXY-6-BROMO-7 - SULFAMYLSPIRO - [1,2,4-BENZOTHIADIAZINE - 3-(4H),1'-CYCLOHEXANE]-1,1-DIOXIDE

By replacing the disulfamylaniline and the ketone reactants employed in Example 1, Step C, by equimolecular quantities of 4-amino-6-bromo-1,3-benzenedisulfonamide and 4-pentyloxycyclohexanone and following substantially the same procedure described in Example 1, Step C, there is obtained 4'-pentyloxy-6-bromo-7-sulfamylspiro-[1,2,4-benzothiadiazine-3(4H),1'-cyclohexane]-1,1-dioxide.

EXAMPLE 7

*4'isopropoxy-6-methoxy-7-sulfamylspiro-[1,2,4-benzothiadiazine-3(4H),1'-cyclohexane]-1,1-dioxide*

STEP A.—PREPARATION OF 4-ISOPROPOXYCYCLOHEXANONE

By replacing the p-methoxyphenol employed in Example 1, Step A, by an equimolecular quantity of p-isopropoxyphenol and following substantially the same procedures described in Example 1, Steps A and B, there is obtained 4-isopropoxycyclohexanone.

STEP B.—PREPARATION OF 4'-ISOPROPOXY-6-METHOXY - 7 - SULFAMYLSPIRO - [1,2,4 - BENZOTHIADIAZINE-3(4H),1'-CYCLOHEXANE]-1,1-DIOXIDE

By replacing the disulfamylaniline and the ketone reactants employed in Example 1, Step C, by equimolecular quantities of 4 - amino-6-methoxy-1,3-benzenedisulfonamide and 4-isopropoxycyclohexanone respectively, and following substantially the same procedure described in Example 1, Step C, there is obtained 4'-isopropoxy-6-methoxy - 7 - sulfamylspiro - [1,2,4 - benzothiadiazine-3(4H),1'-cyclohexane]-1,1-dioxide.

EXAMPLE 8

*4'-methoxy-6-fluoro-7-sulfamylspiro-[1,2,4-benzothiadiazine-3(4H),1'-cyclohexane]-1,1-dioxide*

By replacing the disulfamylaniline reactant employed in Example 1, Step C, by an equimolecular quantity of 4- amino-6-fluoro-1,3-benzenedisulfonamide and following substantially the same procedure described in Example 1, Step C, there is obtained 4'-methoxy-6-fluoro-7-sulfamylspiro - [1,2,4 - benzothiadiazine - 3(4H),1' - cyclohexane]-1,1-dioxide.

EXAMPLE 9

*4'-methoxy-5,6-dichloro-7-sulfamylspiro-[1,2,4-benzothiadiazine-3(4H),1'-cyclohexane]-1,1-dioxide*

By replacing the disulfamylaniline reactant employed in Example 1, Step C, by an equimolecular quantity of 4-amino-5,6-dichloro-1,3-benzenedisulfonamide and following substantially the same procedure described in Example 1, Step C, there is obtained 4'-methoxy-5,6-dichloro-7-sulfamylspiro - [1,2,4 -benzothiadiazine - 3(4H),1' - cyclohexane]-1,1-dioxide.

EXAMPLE 10

*4'-methoxy-6-sulfamyl-7-chlorospiro-[1,2,4-benzothiadiazine-3(4H),1'-cyclohexane]1,1-dioxide*

By following substantially the same procedure described in Example 1, Step C, but replacing the disulfamylaniline reactant by an equimolecular quantity of 2-amino-5-chloro-1,4-benzenedisulfonamide and following substantially the same procedure described in Example 1, Step C, there is obtained 4' - methoxy-6-sulfamyl-7-chlorospiro-[1,2,4-benzothiadiazine-3(4H),1'-cyclohexane] - 1,1 - dioxide.

The compounds of this invention are effective diuretic and/or saluretic agents, and because of this property, they can be used for the treatment of conditions resulting from an excessively high concentration of sodium chloride in an animal organism such as in the treatment of edematous conditions resulting, for example, from congestive heart failure.

The dosage of the novel compounds of this invention will vary over a wide range, and for this reason tablets, pills, capsules and the like containing from about 5 mg. to about 200 mg. or more of active ingredient can be made available to the physician for the symptomatic adjustment of the dosage to the individual patient. These dosages provide a favorable therapeutic ratio as they are well below the toxic or lethal dose of the compounds covered by this invention.

As each of the compounds of this invention can be incorporated in a dosage form similar to that described in the following example or in other dosage forms suitable for oral or parenteral administration which can be prepared by well known methods, only one example is included herein to illustrate the preparation of a representative dosage form.

EXAMPLE 11

[Dry-filled capsules containing 10 mg. of active ingredient per capsule]

| | Per capsule, mg. |
|---|---|
| 4' - methoxy - 6 - chloro - 7 - sulfamylspiro - [1,2,4-benzothiadiazine - 3(4H),1' - cyclohexane] - 1,1-dioxide | 10 |
| Lactose | 265 |

Capsule size No. 2.

The 4' - methoxy - 6 - chloro - 7 - sulfamylspiro - [1,2,4-benzothiadiazine-3(4H),1'-cyclohexane]-1,1-dioxide is reduced to a No. 60 powder. Lactose then is passed through a No. 60 bolting cloth onto the powder. The combined ingredients are admixed for 10 minutes and then filled into No. 2 dry, gelatin capsules.

While the above examples describe the preparation of certain compounds which are illustrative of the novel compounds of this invention, and a certain specific dosage form suitable for administering the novel compounds, and certain reaction conditions for the preparation of the compounds, it is to be understood that the invention is not to be limited to the specific compounds described in the examples or by the specific reaction conditions described for the preparation of the compounds or by the specific ingredients included in the pharmaceutical preparation, but is to be understood to embrace variations and modifications thereof which fall within the scope of the appended claims.

What is claimed is:

1. 4' - lower - alkoxy - 6 - R - 7 - sulfamylspiro - [1,2,4-benzothiadiazine - 3(4H),1' - cyclohexane] - 1,1 - dioxide compounds, wherein R is selected from the group consisting of halogen, lower alkyl, lower alkoxy, nitro and amino.

2. 4' - lower - alkoxy - 6 - halogen - 7 - sulfamylspiro-[1,2,4 - benzothiadiazine - 3 (4H),1' - cyclohexane] - 1,1-dioxide.

3. 4' - methoxy - 6 - chloro - 7 - sulfamylspiro - [1,2,4-benzothiadiazine - 3(4H),1' - cyclohexane] - 1,1 - dioxide.

4. 4' - lower - alkoxy - 6 - trifluoromethyl - 7 - sulfamylspiro - [1,2,4 - benzothiadiazine - 3(4H),1' - cyclohexane]-1,1-dioxide.

References Cited by the Examiner

Derwent: Belgian Patent Reports, vol. 58B, p. C12 (1959).

Derwent: Commonwealth Patent Reports, vol. 186, GP 3A, p. 4 (1960).

Holdrege et al.: Journal American Chemical Society, vol. 81, pp. 4807–10 (1959).

NICHOLAS S. RIZZO, *Primary Examiner.*